United States Patent

[11] 3,587,956

| [72] | Inventor | Waldemar W. Oelke<br>Rossford, Ohio |
|---|---|---|
| [21] | Appl No. | 821,405 |
| [22] | Filed | May 2, 1969 |
| [45] | Patented | June 28, 1971 |
| [73] | Assignee | Libbey-Owens-Ford Company<br>Toledo, Ohio |

[54] APPARATUS FOR CUTTING GLASS PLATES
9 Claims, 9 Drawing Figs.

[52] U.S. Cl. .................................................. 225/93.5,
  219/200
[51] Int. Cl. ...................................................... H05b 3/06,
  B26f 3/12
[50] Field of Search ......................................... 83/16, 171;
  225/2, 93.5; 219/200; 248/362

[56] References Cited
UNITED STATES PATENTS

| 1,777,644 | 10/1930 | Aitner | 225/93.5 |
| 2,584,851 | 2/1952 | Dunipace | 225/93.5X |
| 3,157,328 | 11/1964 | Hennings et al. | 225/93.5X |
| 3,344,968 | 10/1967 | Kovacik et al. | 225/93.5 |
| 3,374,531 | 3/1968 | Bruce | 219/347X |
| 3,406,886 | 10/1968 | Wesel et al. | 225/93.5X |
| 3,452,181 | 6/1969 | Stryjewski | 219/216 |
| 3,474,944 | 10/1969 | Chatelain et al. | 225/93.5 |

FOREIGN PATENTS

| 571,633 | 9/1945 | Great Britain | 225/93.5 |

*Primary Examiner*—J. V. Truhe
*Assistant Examiner*—Hugh D. Jaeger
*Attorney*—Collins and Oberlin ABSTRACT: A method and apparatus for cutting glass plates by applying heat along the desired line of cut from a source which is spaced from the surface of the plate. Resistance-type heating apparatus for applying radiant heat, and a hot air unit for applying convected heat are provided.

PATENTED JUN 28 1971
3,587,956
SHEET 1 OF 2
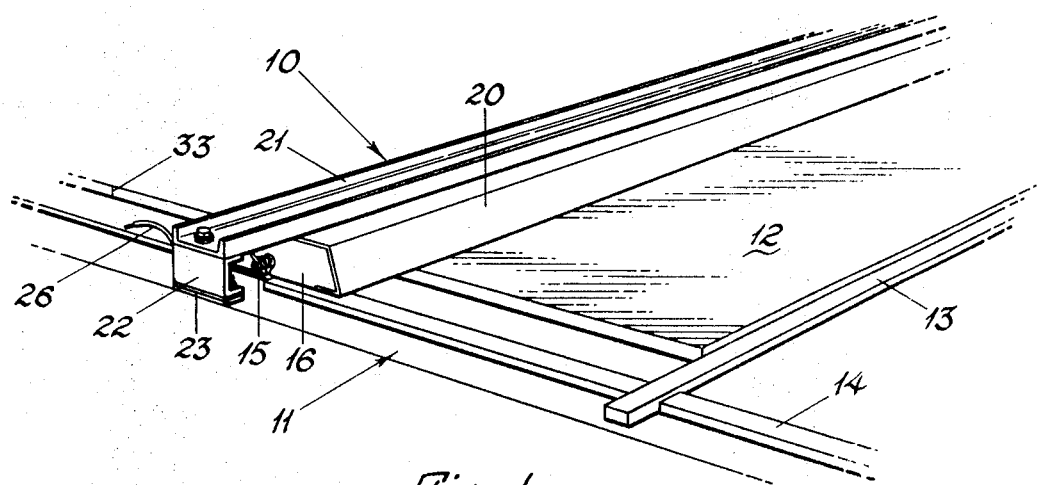
Fig. 1.
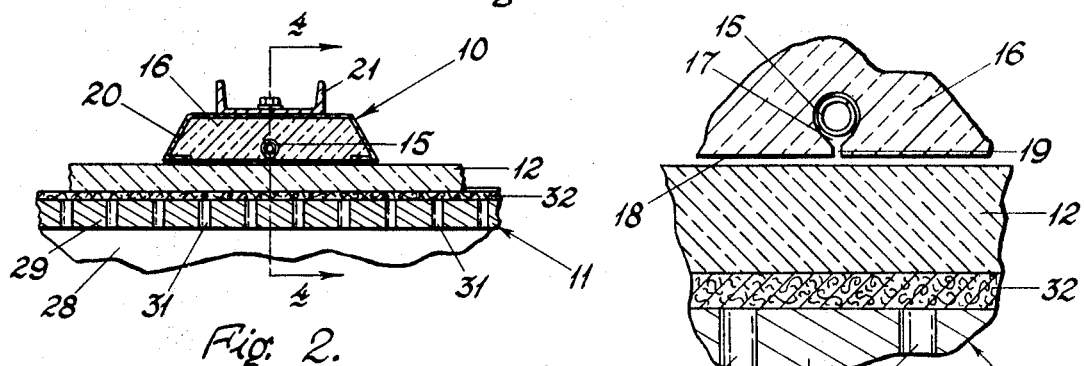
Fig. 2.
Fig. 3.
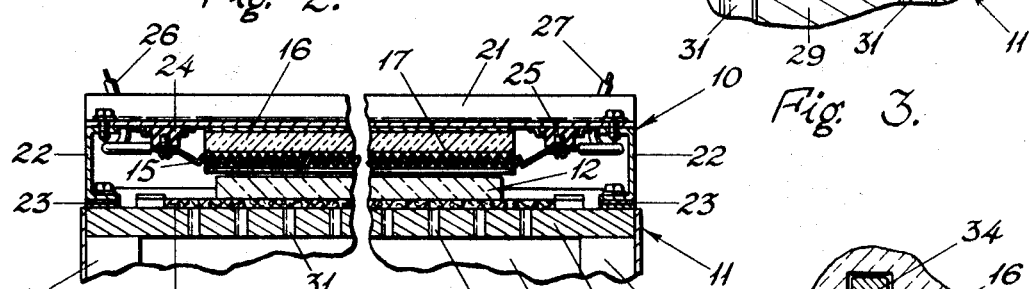
Fig. 4.
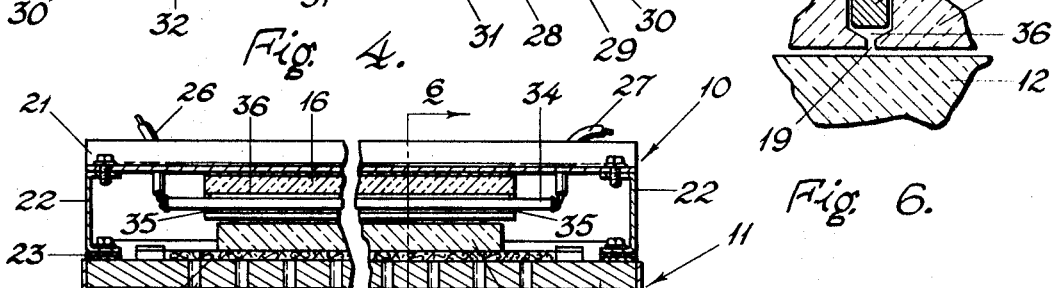
Fig. 5.
Fig. 6.
INVENTOR.
Waldemar W. Oelke
BY
Collins & Oberlin
ATTORNEYS

APPARATUS FOR CUTTING GLASS PLATES

The present invention relates to glass cutting and more particularly to the cutting of glass by the application of heat along the desired line of cut.

The most familiar method of cutting glass is to score the glass along the desired line of cut and then apply a bending force about the score line. Another method which has been employed with some success is to score the glass and then contact it at the score line with a heated wire. In the latter method the isolated heating sets up an unbalanced stress condition in the glass causing the score line to run.

Although the hot wire method has proved to be quite successful in cutting relatively thin sheets, it has been found that when cutting sheets of three-fourths inch thickness or greater there is a tendency for the cut to be rough and uneven. It has been theorized that the problem stems from the fact that as the hot wire contacts the glass the wire cools off momentarily at the contact point so that the radiant heat adjacent the contact point is temporarily greater than the contact heat. Thus, the unbalanced stress condition is not set up directly at the score line but could occur at various points on either side of it. The result is a rough and uneven cut.

As a solution to the problem the invention contemplates using a method wherein the heat source does not contact the glass. According to one aspect of the invention radiant heat from a hot wire source is applied to the cutting line, and according to another aspect convected heat from a hot air source is applied.

In accordance with the above, the primary object of the invention is to provide a method and apparatus for cutting glass, by the application of heat, which produces a clean, uniform break.

Another object of the invention is to provide a method and apparatus for cutting glass sheets by the application of heat concentrated at the desired line of cut.

Another object of the invention is to provide a cutting method in which it is unnecessary to first score the sheet.

Another object is to provide apparatus for applying concentrated radiant heat at the line of cut.

Another object is to provide apparatus for applying concentrated convected heat at the line of cut.

Other objects and advantages will become more apparent during the course of the following description when taken in connection with the accompanying drawings.

In the drawings wherein like numerals are employed to designate like parts throughout the same:

FIG. 1 is a perspective view of a heated wire-cutting apparatus;

FIG. 2 is a transverse sectional view of the apparatus of FIG. 1;

FIG. 3 is an enlarged fragmentary sectional view similar to FIG. 2;

FIG. 4 is a sectional view taken along line 4–4 of FIG. 2;

FIG. 5 is a fragmentary sectional view of an alternative embodiment of the invention;

FIG. 6 is an enlarged fragmentary sectional view taken along line 6–6 of FIG. 5;

Figure 7:
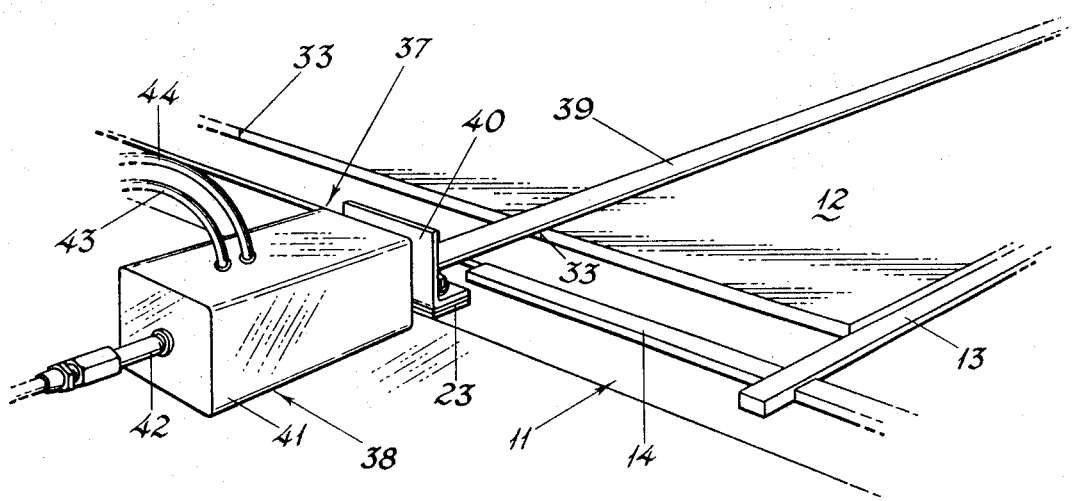
FIG. 7 is a perspective view of another alternative embodiment of the invention.

Referring to the drawings, FIG. 1 depicts a hot wire-type heating apparatus, indicated generally by the numeral 10, mounted on a cutting table 11. A glass sheet 12 is shown on the table with its leading edge contacting a gauging bar 13 which is held in place by a locating device 14.

In the embodiment illustrated in FIG. 1, the heating element is a coil of wire 15 which is encased in a relatively massive lock of insulating material 16 such as Glasrock or Marinite. As shown in FIG. 4, the block 16 is slightly longer than the width of the sheet 12 to be cut and the coil 15 is received in a longitudinal hole 17 formed in the block near the lower surface 18 (FIG. 3). To provide a restricted path for the radiant heat emanating from the coil a 1/16-inch wide slot 19 runs from the surface 18 to the hole 17.

The block 16 is retained within a metal casing 20 attached to a channel support member 21 which extends beyond the ends of the block 16 and is supported on side support members 22 attached to the top of the cutting table 11. It has been found that when cutting ¾-inch sheets excellent results are obtained if the surface 18 is placed about one-sixteenth -inch above the top surface of the sheet, although it can be appreciated that sheets of different thickness may require different clearances for optimum results.

To provide the correct spacing, shims 23 are provided (FIGS. 1 and 4) which can be placed between the side support 23 and the table 11.

Referring again to FIG. 4, the coil 15 is connected at each end to insulated junction blocks 24, 25 attached to the casing 20 and lead wires 26, 27 extend from the insulators to a suitable source of electrical energy (not shown).

Positioning and movement of the sheet 12 for cutting is facilitated by supporting the sheet on a cushion of air. To this end, as illustrated in FIGS. 2, 3 and 4, the table 11 includes a plenum chamber 28 formed by top wall 29, sidewalls 30 and a bottom wall (not shown). The top wall 29 is perforated by a plurality of holes 31 communicating with the plenum chamber and is covered with a layer 32 of a nonabrasive material such as felt.

The plenum chamber is connected to a suitable source of pressurized air (not shown) and sufficient pressure is maintained therein to support the sheet 12 on a cushion of air which flows through the holes 31 and is diffused through the felt 32. In addition to facilitating handling of the sheet to place it in position for cutting, the air cushion aids in running the cut as the weight of the sheet on either side of the heated line will tend to bend the sheet about that line.

It has been found that when the heat-cutting method of the present invention is employed it is not necessary to first score the sheets, although a score mark 33 at opposite edges of the cutting line as shown in FIG. 1 provides further assurance that the edges will break cleanly.

In a typical cutting operation the gauging bar 13 and the locating device 14 are set a predetermined distance from the slot 19. A glass sheet, or blank is slid beneath the heating apparatus 10 and the power supply turned on. As the heating coil 15 is energized, heat is radiated through the slot 19 and against the sheet. Because of the limited path provided for the heat and the large insulating mass 16 surrounding it the heat is effectively concentrated in the narrow line defined y the slot. By so concentrating the heat a large temperature differential is set up between the unheated portion of the sheet and the very limited heated area and the coincident stress buildup causes a clear, uniform break.

By way of example, excellent results have been obtained on ¾-inch glass using 24 ga. nichrome wire having a coiled length of 50 inches, and a power input of 960 watts. Under these conditions the coil reaches 1400°—1500° F., and the cut can be run in 5 to 15 seconds.

In FIGS. 5 and 6 there is illustrated an alternative embodiment of the invention in which the heating coil 15 is replaced by a solid bar-type heating element 34. The construction details of the respective apparatus are essentially identical as illustrated by comparing FIGS. 4 and 5; however, the bar 34 is supported entirely by the insulating block 16 by means of spacers 35 which center the bar within the hole 36 provided therefor. When a solid bar element is employed there is no need for separately mounted junction blocks, and the lead wires 26,27 can be connected directly to the bar, as shown in FIG. 5.

Figure 8:
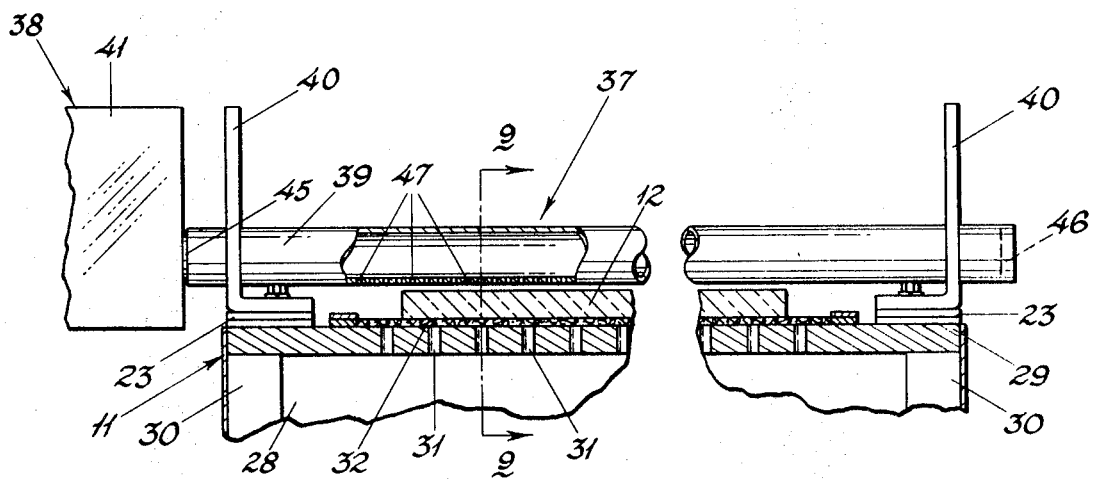
FIG. 8 is a longitudinal elevation of the apparatus of FIG. 7, shown partly in section.
Figure 9:
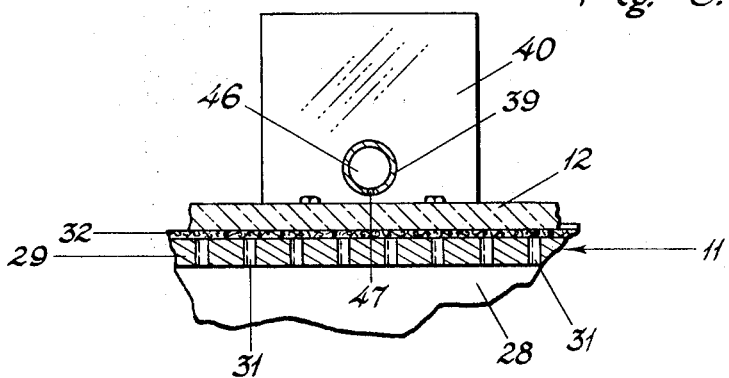
FIG. 9 is a sectional view taken along line 9–9 of FIG. 8.

FIGS. 7, 8 and 9 illustrate a further embodiment of the invention in which convected heat is employed to run the cut. As shown in FIG. 7 the convection heating apparatus, designated generally by the numeral 37, comprises an air heater 38, a distribution tube 39, and support members 40 attached to the cutting table 11.

The air heater 38 comprises a housing 41 defining a heat exchange chamber, an air inlet connector 42 connecting the chamber to a source of pressurized air, and a heating element (not shown) mounted within the chamber and connected to a suitable electrical supply by means of leads 43 and 44.

The distribution tube 39 can be made of ordinary pipe connected to the air heater 38 by threading onto a nipple 45 (FIG. 8) which is rigidly secured to the heater opposite the inlet connection 42. The opposite end of the tube 39 is closed by a plug 46 and a single row of small holes 47 is formed in the wall of the tube to distribute the heated air against the sheet along a narrow line.

By way of example, excellent results have been obtained on ¾-inch glass using a 1½-inch distribution pipe having 1/32-inch diameter holes spaced on ⅛-inch centers, with the air at 2 p.s.i. and heated to 600°—900° F. These conditions also yielded a cutting time of 5 —15 seconds.

The support members 40 are simple L-shaped brackets fastened on opposite sides of the table 11 and have holes formed in their vertical legs to receive the tube 39. The tube can be secured to the brackets by any convenient means such as welding, and by virtue of the rigid mounting of the tube the air heater can be simply cantilevered over the supports with no additional mounting.

The height of the tube 39 above the table is adjusted by means of shims 23 in a manner similar to that employed when using the hot wire heater. It has been found, for example, that when cutting ¾-inch thick glass, a height which will provide a spacing of about one-eighth inch between the top of the glass and the outlet holes 47 yields particularly good results.

It is to be understood that the forms of the invention herewith shown and described are to be taken as illustrative embodiments of the same and that various changes in the shape, size and arrangement of parts as well as various procedural changes may be resorted to without departing from the spirit of the invention.

I claim:

1. In apparatus for cutting glass plates, including means defining a supporting surface against which said plates rest in position to be cut and heating means disposed above said supporting surface, the improvement comprising a heat source within said heating means disposed parallel to said surface and positioned above it a distance sufficient to be spaced from a glass plate resting thereon, means for directing the heat emanating from said source toward said surface, and means restricting the effective area of said heat to a narrow line corresponding to the desired line of cut.

2. A Apparatus for cutting glass plates as claimed in claim 1, in which said heating means comprises an elongated insulating member mounted above and extending across said supporting surface, said insulating member having a flat surface substantially parallel to and facing said supporting surface; and a radiant-heating element contained within a longitudinal cavity formed in said insulating member, said cavity opening into said flat surface via a narrow slot extending across said insulating member along a line corresponding to the desired line of cut; whereby radiant heat emanating from said heating element is directed through said slot and against said plate along a narrow line to define said line of cut.

3. Apparatus for cutting glass plates as claimed in claim 2, in which said radiant-heating element comprises a wire coil-type electrical-heating element.

4. Apparatus for cutting glass plates as claimed in claim 2, in which said radiant-heating element comprises a solid bar-type electrical-heating element.

5. Apparatus for cutting glass plates as claimed in claim 1, in which said heating means comprises a tube spaced above said supporting surface and having a plurality of perforations formed therein opening toward said surface and arranged in a row along a line corresponding to the desired line of cut; an enclosed air heater communicating with said tube for heating air passing therethrough; and means for supplying air to said air heater, whereby heated air flows into said tube, and through said perforations against said plate in a narrow line to define said line of cut.

6. Apparatus for cutting glass plates as claimed in claim 5, in which said air heater comprises a chamber having an inlet opening to which said air supply is connected and an outlet opening to which said tube is connected, and an electric-heating element interposed in the path followed by said air in flowing from said inlet to said outlet opening.

7. Apparatus for cutting glass plates as claimed in claim 1, including a plenum chamber disposed beneath said supporting surface; a plurality of orifices formed in said surface and communicating with said plenum chamber; and means for supplying air under pressure to said plenum chamber, said air flowing through said orifices to form an air cushion between said plates and said supporting surface.

8. Apparatus for cutting glass plates as claimed in claim 7, including an air pervious cover adhered to said supporting surface over said orifices.

9. Apparatus for cutting glass plates as claimed in claim 8, in which said cover comprises a layer of felt.